(12) United States Patent
Crawford

(10) Patent No.: US 11,493,156 B2
(45) Date of Patent: Nov. 8, 2022

(54) HAMMERLESS AND TORQUELESS UNION CONNECTION

(71) Applicant: Utex Industries, Inc., Houston, TX (US)

(72) Inventor: Paul Crawford, Houston, TX (US)

( * ) Notice: Subject to any disclaimer, the term of this patent is extended or adjusted under 35 U.S.C. 154(b) by 0 days.

(21) Appl. No.: 16/829,381

(22) Filed: Mar. 25, 2020

(65) Prior Publication Data

US 2021/0301953 A1  Sep. 30, 2021

(51) Int. Cl.
  *F16L 19/00* (2006.01)
  *F16L 15/00* (2006.01)
  *F16L 15/08* (2006.01)
  *F16L 19/02* (2006.01)

(52) U.S. Cl.
  CPC ............ *F16L 15/006* (2013.01); *F16L 15/08* (2013.01); *F16L 19/005* (2013.01); *F16L 19/0206* (2013.01)

(58) Field of Classification Search
  CPC ..... F16L 19/0206; F16L 15/006; F16L 15/08; F16L 19/005; F16L 19/0231
  USPC .......................................... 285/387, 388, 91
  See application file for complete search history.

(56) References Cited

U.S. PATENT DOCUMENTS

| | | | | |
|---|---|---|---|---|
| 904,673 A * | 11/1908 | Bideker | ............... | F16L 27/0812 285/332.3 |
| 1,254,375 A * | 1/1918 | Thompson | ............ | F16L 25/065 285/90 |
| 1,568,649 A * | 1/1926 | Woodruff | ............... | F16L 27/067 285/106 |
| 2,443,394 A * | 6/1948 | Le Clair | ............. | F16L 27/0812 285/388 |
| 2,726,104 A * | 12/1955 | Boitnott | ................ | F16L 27/082 285/98 |
| 2,880,019 A * | 3/1959 | Wurtz | ................. | F16L 19/0218 285/95 |
| 3,113,792 A * | 12/1963 | Brown | ................ | F16L 19/0231 285/354 |
| 4,802,695 A * | 2/1989 | Weinhold | .............. | F16L 19/005 285/91 |
| 4,867,483 A * | 9/1989 | Witt | ..................... | F16L 19/0218 285/23 |
| 4,927,192 A * | 5/1990 | Ungchusri | .......... | F16L 19/0231 285/305 |
| 5,131,692 A * | 7/1992 | Lemons | .................. | E21B 21/01 285/334.2 |

(Continued)

*Primary Examiner* — David Bochna
(74) *Attorney, Agent, or Firm* — James Robert (Jim) Johnson

(57) ABSTRACT

A union connection common in connecting pipelines in various industries comprises a threaded female pipe end, a male pipe end insertable into the female pipe end to form a sealed connection, a plurality of shaped ring segments and a threaded collar in which the shaped ring segments are placed in a shaped groove on the male pipe and positioned in the threaded collar. The threaded female pipe end is then threaded onto the threaded collar, the threads each being clocked so as to press the collar against the male pipe using the ring segments and into a sealed connection with the female pipe. A pin inserted through a pin hole in the collar and into a pin recess in the female pipe end holds the parts in place. The pin hole and pin recess are positioned relative to the clocked threads of the collar and female pipe.

5 Claims, 9 Drawing Sheets

(56) References Cited

U.S. PATENT DOCUMENTS

| | | | |
|---|---|---|---|
| 8,857,863 B1* | 10/2014 | Patin | F16L 19/025 |
| | | | 285/386 |
| 10,053,923 B2* | 8/2018 | Johnson | F16L 19/05 |
| 2007/0063513 A1* | 3/2007 | Boyd | F16L 15/04 |
| | | | 285/355 |
| 2015/0226355 A1* | 8/2015 | Ungchusri | F16L 19/0231 |
| | | | 29/428 |

* cited by examiner

HAMMERLESS AND TORQUELESS UNION CONNECTION

FIELD OF THE INVENTION

The invention relates generally to union connections used to connect pipeline elements in a pipeline in which there is a need to remove a union connection from time-to-time in order to perform maintenance or other work on the pipeline and then replace the union connection securely and without leakage in the pipeline.

BACKGROUND OF THE INVENTION

Union connections are commonly found in a range of plumbing and other pipeline systems requiring the secure connection of pipe ends where there is a concurrent need, from time-to-time, to remove the union connection in order to perform maintenance or other work on the pipeline system.

The common form of union connection includes a combination of a female pipe having a shaped female end to receive a male pipe end, a male pipe having a shaped end to be received into the female pipe end, and a collar. The female pipe comprises a thread element on its outer surface which is threadedly mated to a thread element on the inner surface of the collar. The male pipe is workably inserted through an opening in the collar. The shaped end of the male pipe is inserted into the shaped end of the female pipe. The shape of each of the male pipe end and the female pipe end are such that when the two ends are compressed together, they form a sealed connection between the two pipes. This is accomplished by threading the threads of the collar onto the threads of the female pipe until the collar is threaded onto the female pipe tightly enough to compress the male pipe end into the female pipe end to form a seal. In some forms of union connections, a separate elastomeric seal is used to seal the connection between the female pipe and male pipe.

These forms of union connections are commonly assembled using pipe wrenches and hand tools and are tightened by feel (that is, until they feel tight enough) or until any leaks stop. In many applications, the collar and female pipe are threaded together using a torque wrench to ensure a known minimum torque is obtained.

In high pressure typical in the oil well pumping service applications, the same form of union connection is used, although the size of the parts is scaled up to meet the needs of pipes which will see pressures of 15,000 psi or more. To connect union connections at this scale, it is often necessary to use hammers to hammer connections to be tight enough to form a sealed joint. This, of course, raises the possibility of injury to workers and to the breaking of parts. Alternately, these connections may often require additional power operated tools to perform operations. This adds to labor needs for this work. There is a need for a union connection which can be assembled and disassembled in the field with a minimum of tools and in particular without the need to use hammers or torque wrenches. The present invention meets these needs.

SUMMARY OF THE INVENTION

The invention is a hammerless and torque-less union connection comprising a female pipe, a male pipe, a collar, a plurality of shaped ring segments and a pin.

The female pipe is substantively a hollow cylindrical tube with a fluid passage. The female pipe has a first end and a second end. The first end of the female pipe has an outer diameter and an inner diameter slightly smaller than the outer diameter. The first end of the female pipe is configured to be attachable to a pipe of equal inner and outer diameters and suitable to be used in a pipeline. The attachment of the first end of the female pipe to another pipe may be made by any suitable means, such as welding, threading or other known method.

The second end of the female pipe has a larger outer diameter than the first end of the female pipe and an inner diameter approximately the size of the outer diameter of the first end of the male pipe (as described below). The second end of the female pipe is sized and shaped to permit the secure, sealable insertion of the first end of the male pipe. The second end, of the female pipe further comprises a thread on its outer surface. The thread is of a known length.

The male pipe has a first end and a second end. The male pipe is also approximately a hollow cylindrical tube with a central fluid passage. The male pipe has an outer diameter and an inner diameter slightly smaller than the outer diameter. The outer surface of the male pipe has disposed thereon toward the first end of the male pipe at least one shaped and sized groove. The second end of the male pipe is configured to be attachable to a pipe of equal inner and outer diameter and used in pipelines. The attachment of the second end of the male pipe to a second pipe may be by welding, threading or other form of secure attachment.

The first end of the male pipe is configured to be inserted into the second end of the female pipe to create a sealed fluid connection between the two pipes. For the purposes of this disclosure, references to "sealed" (or similar terms) refers to a connection through which no leakage occurs. The first end of the male pipe has disposed thereon at least one groove sized and shaped to contain an elastomeric seal to seal the connection between the female pipe and male pipe.

The ring segments are shaped and sized to fit snugly into the shaped groove proximal to the second end of the male pipe. Further, a plurality of individual ring segments fit together to form a connected ring with an inner circumference equal to or slightly larger than the circumference of the bottom of the shaped groove of the male pipe. The cross-sectional shape of each ring segment is configured such that when the parts of the invention are assembled, the ring segments apply compressive forces and not shear forces to retain the male pipe in place against or in close proximity to the female pipe through the collar. The shaped and sized groove of the male pipe is sized to contain a portion of each of the plurality of ring segments within the shaped and sized groove while exposing an approximately equal portion of each of the plurality of ring segments above the outer surface of the male pipe.

The collar of the invention is essentially a hollow cylindrical tube and is generally in the form of union connection collars known in the industry. The collar has a first end and a second end. The first end of the collar has an outer diameter and an inner diameter slightly smaller than the outer diameter. The collar has an inner surface on which is disposed a thread suitable to be mated to the thread on the outer surface of the female pipe. The inner diameter of the first end of the collar is sized to permit the insertion of the second end of the male pipe fully into the collar and the second end of the female pipe, engaged with the first end of the male pipe, into the first end of the collar to permit threading of the thread of the collar with the thread of the female pipe. The second end of the collar has an outer diameter equal to the outer diameter of the first end of the collar. The second end of the collar has an inner diameter smaller than the inner diameter of the first end of the collar. Disposed between the first end of the collar and the second end of the collar is a shaped ridge suitable to contact the portion of each of the plurality of ring segments which extends above the outer surface of the shaped and sized groove of the male pipe.

The collar has disposed therein two holes. A first hole is disposed toward the first end of the collar and is cut through the wall of the collar. This hole is provided to permit the insertion of the pin provided to hold the female pipe in position in the collar. Disposed in a fixed position in the female pipe is a hole cut partially into the outer surface of the female pipe (a blind hole) to accept a portion of the pin placed in the first hole of the collar.

The collar has a second hole sized and positioned to permit each of the plurality of ring segments to be placed in position in the shaped groove of the male pipe when the male pipe is in a suitable position partially inside the collar.

DETAILED DESCRIPTION OF THE INVENTION

The invention 100 is described below as to one or more embodiments thereof and one or more embodiments of the primary components of the invention 100. The invention 100 is not limited to the specific descriptions below but may be undertaken, made and used in any form, shape, size, material, feature, orientation or other modification that permits the fulfillments of the objectives and intentions of the invention 100. In this specification, common terms, including "inner," "outer," "wall," "surface" and similar terms not specifically defined are to be understood in the ordinary sense of each term.

Figure 1:
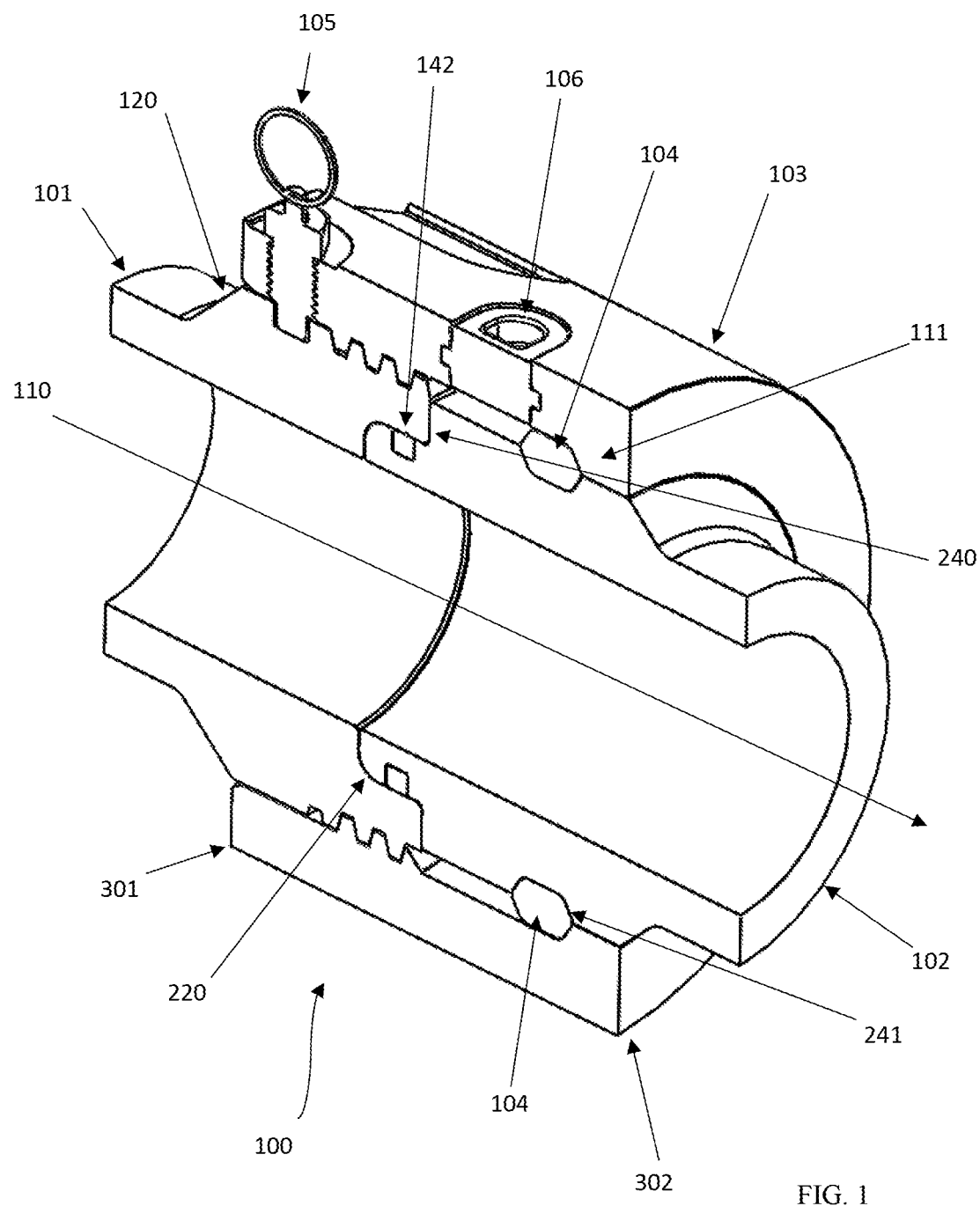
FIG. 1 depicts a cut-away orthogonal view of the assembled parts of the invention.

Referring first to FIG. 1, the assembled components of the invention 100 are depicted. The core parts of the invention 100 include a female pipe 101, a male pipe 102, a collar 103, a plurality of ring segments 104 and a pin 105. In addition, a cap 106 in the collar 103 used to cover the hole through which ring segments are inserted onto the shaped groove of the male pipe 102 is depicted.

Figure 2:
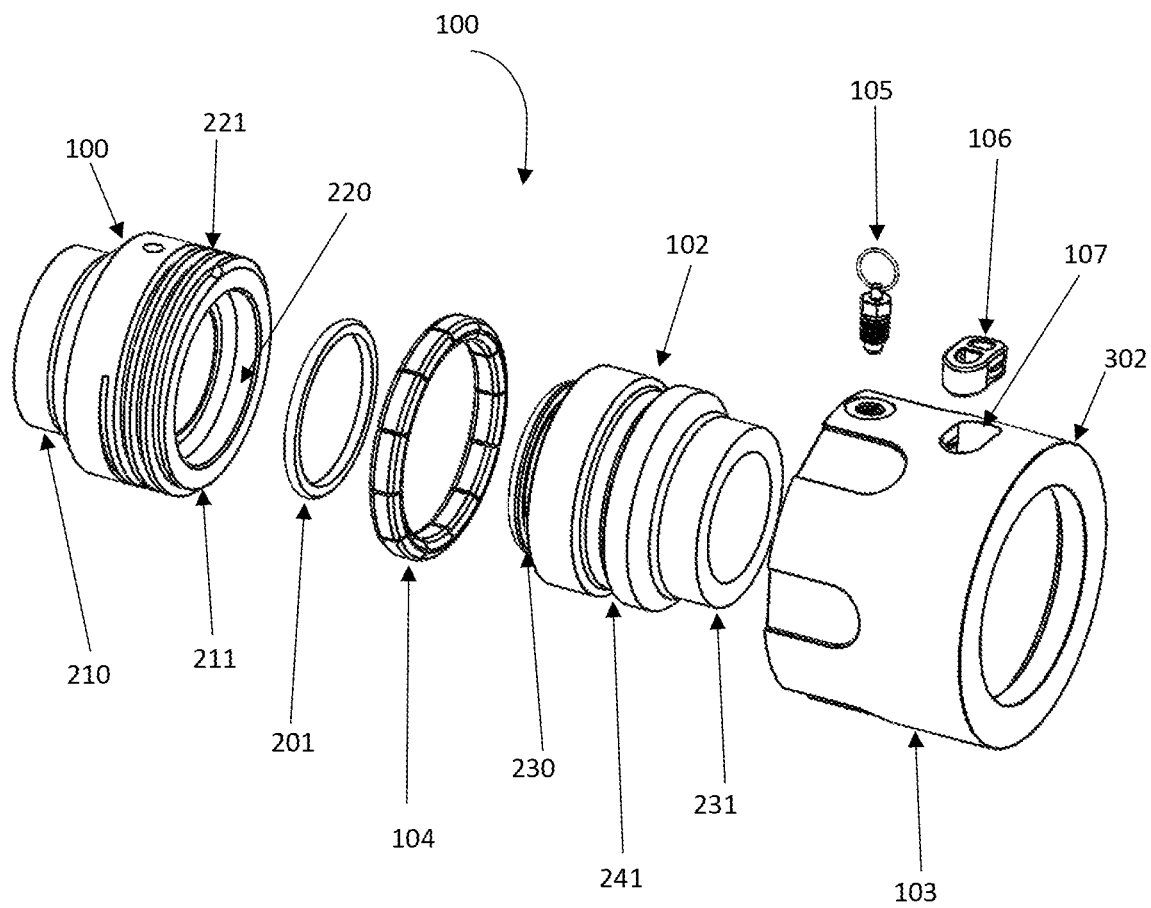
FIG. 2 depicts an exploded orthogonal view of the parts of the invention, including a sealing ring.
Figure 3:
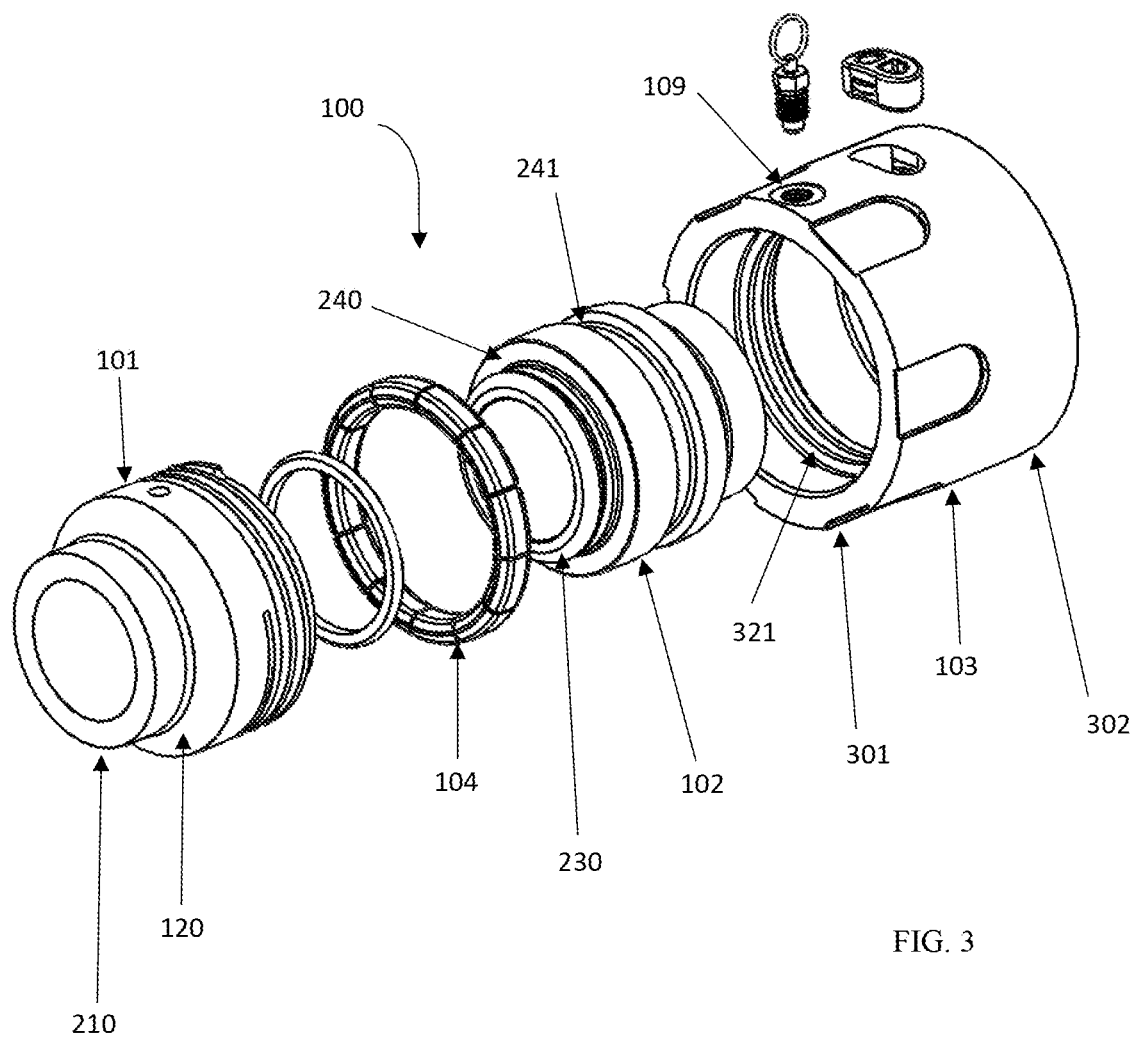
FIG. 3 depicts a second exploded view of the parts of the invention showing additional features thereof and including a sealing ring.

Referring now to FIG. 1, FIG. 2 and FIG. 3 together, the parts of the invention are further depicted. As shown best in FIG. 1, female pipe 101 and male pipe 102 combine to create a primary feature of the invention 100—a smooth central fluid passage 110. As can be seen, when male pipe 102 is inserted into female pipe 101, the inner surfaces of each together form a continuous smooth interior surface. This permits the invention 100 to be useful for its primary purpose—the undertaking of smooth fluid flow through a pipeline.

Referring still to these figures but specifically to FIG. 2 and FIG. 3, female pipe 101 is a short length of generally cylindrical pipe having a first end 210 and a second end 211. A view of the first end 210, as shown better in FIG. 3, shows female pipe 101 has an outer diameter and an inner diameter slightly smaller than the outer diameter. This results in a wall thickness, which is determined by the functional requirements of the pipeline on which the invention 100 is used. The first end 210 of the female pipe 101 is designed to be fluidly connectable to a pipeline element (not depicted) in the pipeline in which the invention 100 is used. Referring to FIG. 1, FIG. 2 and FIG. 3, the female pipe 101 has a flare 120 built into it such that from the flare 120 of the female pipe 101 to the second end 211 of the female pipe 101 the body of the female pipe 101 is thicker than at the first end 210 of the female pipe 102. Thus, the second end 211 of the female pipe 101 has an outer diameter which is larger than the outer diameter of the first end 210 of the female pipe 101. As depicted in FIG. 1 and FIG. 2, female pipe 101 has disposed in the second end 211 thereof a recess 220 sized to allow the insertion of the first end 230 of the male pipe 102 into the recess 220 of the female pipe 101. Thus, the inner diameter of the second end 211 of the female pipe 201 is determined in part by the outer diameter of the first end 230 of the male pipe 231.

Male pipe 102 is a short length of generally cylindrical pipe. Male pipe 102 has a first end 230 and a second end 231. As depicted in FIG. 1 and FIG. 3, the first end 230 of the male pipe 102 has an outer diameter and an inner diameter slightly smaller than the outer diameter. The outer diameter is sized to allow insertion of at least part of the first end 230 of the male pipe 102 fully into the recess 220 of the female part 101 (depicted in FIG. 1 and FIG. 2).

As depicted best in FIG. 1 and FIG. 2, the second end 231 of male pipe 102 has an outer diameter and an inner diameter in which the inner diameter is slightly less than the outer diameter. The second end 231 of the male pipe 102 is configured to be attached by processes known in the industry to a separate pipe in a pipeline (not depicted) in the same manner or similar manner as the first end 210 of the female pipe 101. Referring to FIG. 1 and FIG. 3, male pipe 102 has disposed thereon a stop wall 240 associated with a thickened section of the structure of male pipe 102. Stop wall 240 prevents excess insertion of the first end 230 of male pipe 102 into recess 220 of female pipe 101. The stop wall 240 and first end 230 of male pipe 102 take generally the shape of the recess 220 of the second end 211 of female pipe 101 in order to assure a tight connection between those parts.

As depicted in each of FIG. 1, FIG. 2 and FIG. 3, approximately halfway between the first end 230 and the second end 231 of the male pipe 102 is a shaped groove 241. Shaped groove 241 will be described in more detail with the description of the ring segments 104.

As best depicted in FIG. 1 and FIG. 3, collar 103 is generally a hollow cylinder in shape with first end 301 and a second end 302. The first end 301 of collar 103 has an outer diameter and an inner diameter slightly smaller than the outer diameter. The inner diameter of the collar 103 at the first end 301 is sized to permit the functional insertion of the male pipe 102 and female pipe 101 into the interior of the collar 103, as well as the assembled ring segments 104 as depicted in FIG. 1. As depicted in FIG. 1 and FIG. 2, the second end 302 of collar 103 has an outer diameter substantially equal to the outer diameter at the first end 301 of collar 103, with no substantial variation along the length of the collar 103. The second end 302 of collar 103 has an inner diameter smaller than the inner diameter of the first end 301 of the collar 103. This smaller inner diameter results from the disposition of a projection 111 sized and shaped to abut against the portion of each ring segment 104 which rises above the outer surface of the male pipe 102, as depicted best in FIG. 1. The inner diameter of the second end 302 of the collar 103 matches the maximum outer diameter of the male pipe 102. This is also depicted in FIG. 1.

Figure 4:
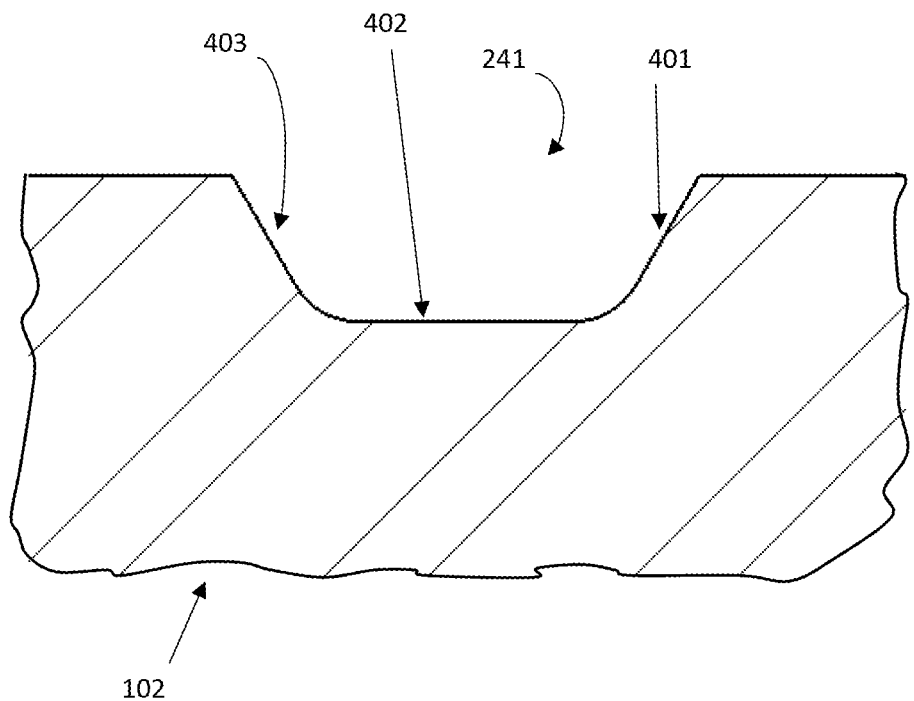
FIG. 4 depicts a partial cross-sectional detail of the shaped groove of the male pipe.

Referring now to FIG. 1, FIG. 3, FIG. 4 and FIG. 5 together, the shape of the shaped groove 241 and ring segments 104 are described. As described above, the shaped groove 241 is incorporated onto the outer surface of the male pipe 102 approximately halfway between the first end 230 and second end 231 of the male pipe 102. As depicted in FIG. 4, the shaped groove 241 is cut or otherwise disposed into the body of male pipe 102. The shaped groove 241 comprises a first groove wall 403, a groove bottom 402, and a second groove wall 401. The angle between the first groove wall 403 and the groove bottom 402 is between 105 degrees and 120 degrees. The shaped groove 241 is disposed around the outer circumference of the male pipe 102.

Figure 5:
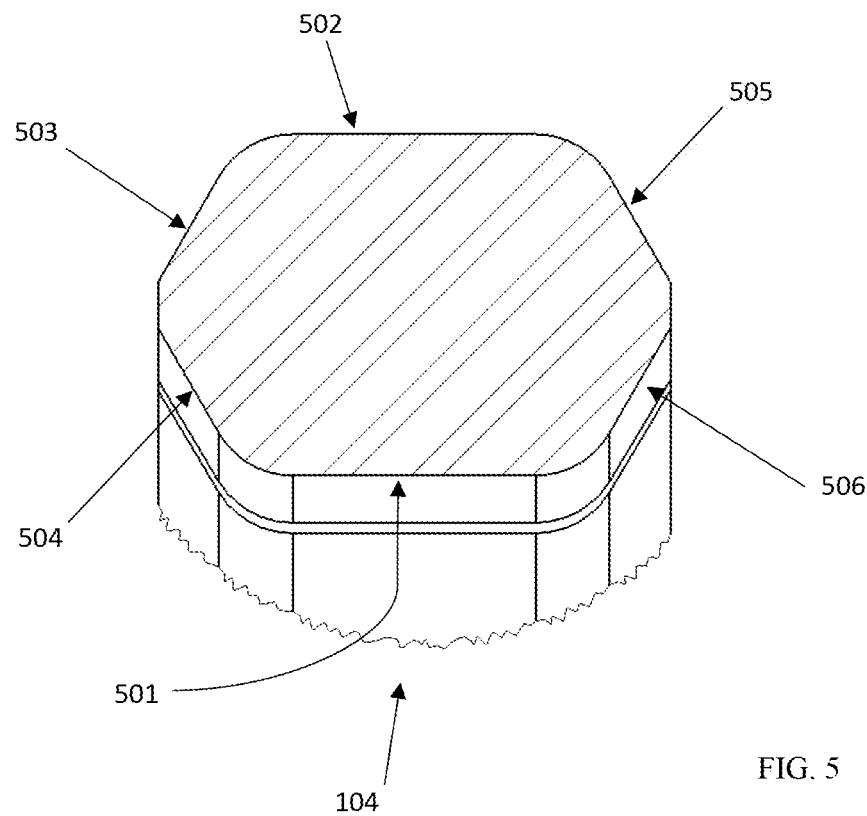
FIG. 5 depicts a partial cross-sectional of one ring segment.

As depicted in FIG. 5, the cross-sectional view of one of the ring segments 104 shows the shape of each ring segment 104 to be approximately an elongated hexagon (also described as two isosceles trapezoids joined at their bases. Each ring segment 104 comprises a bottom 501, a top 502, a first upper side 503, a second upper side 505, a first lower side 504 and a second lower side 506. The angle between the bottom 501 of the ring section 104 and each of the first lower side 504 and second lower side 506 is between 105 degrees and 120 degrees. Likewise, the angle between the top 502 and each of the first upper side 503 and the second upper side 505 is between 105 degrees and 120 degrees. In a given embodiment of the invention, the angle between the elements of the shaped groove 241 must match the angle of the corresponding elements of each of the ring segments 104. The specific angle used in a given application is determined through finite element analysis or other computational or experimental process.

Referring also to FIG. 2, the ring segments 104 comprise a plurality of individual components which are assembled in a ring-shape seal for use in the invention 100. In FIG. 2, the ring formed by the plurality of ring segments 104 is composed of 12 ring segments 104. This number is not a limitation on the invention. In other embodiments, a single shaped ring can be used or a ring comprised of as few as 2 ring segments 104. There is no necessary upper limit on the number of ring segments 104 which can form a ring although as a practical matter it is more economical to limit the number of ring segments 104 to fewer rather than more. The primary limitation on the assembly of ring segments 104 into a ring for use in the invention 100 is that the ring segments 104 must assemble into a ring capable of functioning for its intended use in the assembled invention 100.

Referring also to FIG. 1, ring segments 104 are depicted seated in shaped groove 241 of the male pipe 102. Specifically, the bottom 501 of a ring segment 104 is seated on the bottom 402 of the shaped groove 241 and each of the first side lower side 504 and second lower side 506 is imposed against each of the first groove wall 403 and second groove wall 401, respectively. As shown in FIG. 1, a portion of the ring segments 104 extend above the shaped groove 241. When the male pipe 102 and the plurality of ring segments 104 are placed properly within the collar 103, a portion of each ring segment 104 lies within a small cavity formed between, the male pipe 102 and the collar 103. This cavity permits the male pipe 102 or the collar 103 to be manipulated to aid assembly of the invention 100, specifically by allowing the plurality of ring segments 104 to be positioned on the shaped groove 241 through a hole filled by cap 106, as described below by rotating male pipe 102 inside collar 103 (or by rotating the collar 103 around the male pipe 102). When the male pipe 102 is in its proper position, the top 502 and second upper side 505 of the plurality of ring segments 104 is pressed against corresponding surfaces formed on the projection 111 in the collar 103. The angle formed by these surfaces of the projection 111 must match the angle between the top 502 and the second upper side 505 of each ring segment 104.

Referring to FIG. 2, the second end 211 of the female pipe 101 has disposed thereon, by cutting, molding or other process, a screw thread 221. The screw thread 221 is cut or made to a specific linear length measured circumferentially around the outer surface of the second end 220 of the female pipe 101. Referring to FIG. 3, disposed on the inner surface of the collar 103 is a mated screw thread 321 set back from the first end 301 of the collar 103. The amount of the set back of the position of the screw thread 321 from the first end 301 of the collar 103 is determined in part by the position of a pin hole 109 into which pin 105 is inserted when the invention 100 is assembled.

The length of the screw thread 321 of the collar 103 is equal to or slightly longer than the screw thread 221 of the female pipe 101. This is an important element of the invention. As described in more detail below, when the invention 100 is assembled, the screw thread 221 of the second end 211 of the female pipe 101 is screwed into the mated screw thread 321 in the collar 103. When so screwed into place, the specific lengths of screw threads 221 and 321 must accomplish the function of pressing the plurality of ring segments 104 into projection 111 to hold the male pipe 102 in place within the collar 103 and to align, the orientation of the female pipe 101 and collar 103 relative to each other so that pin 105 may be fully inserted into pin hole 109 of collar 103 and further into a pin receptor hole 601 more fully described below.

Figure 6:
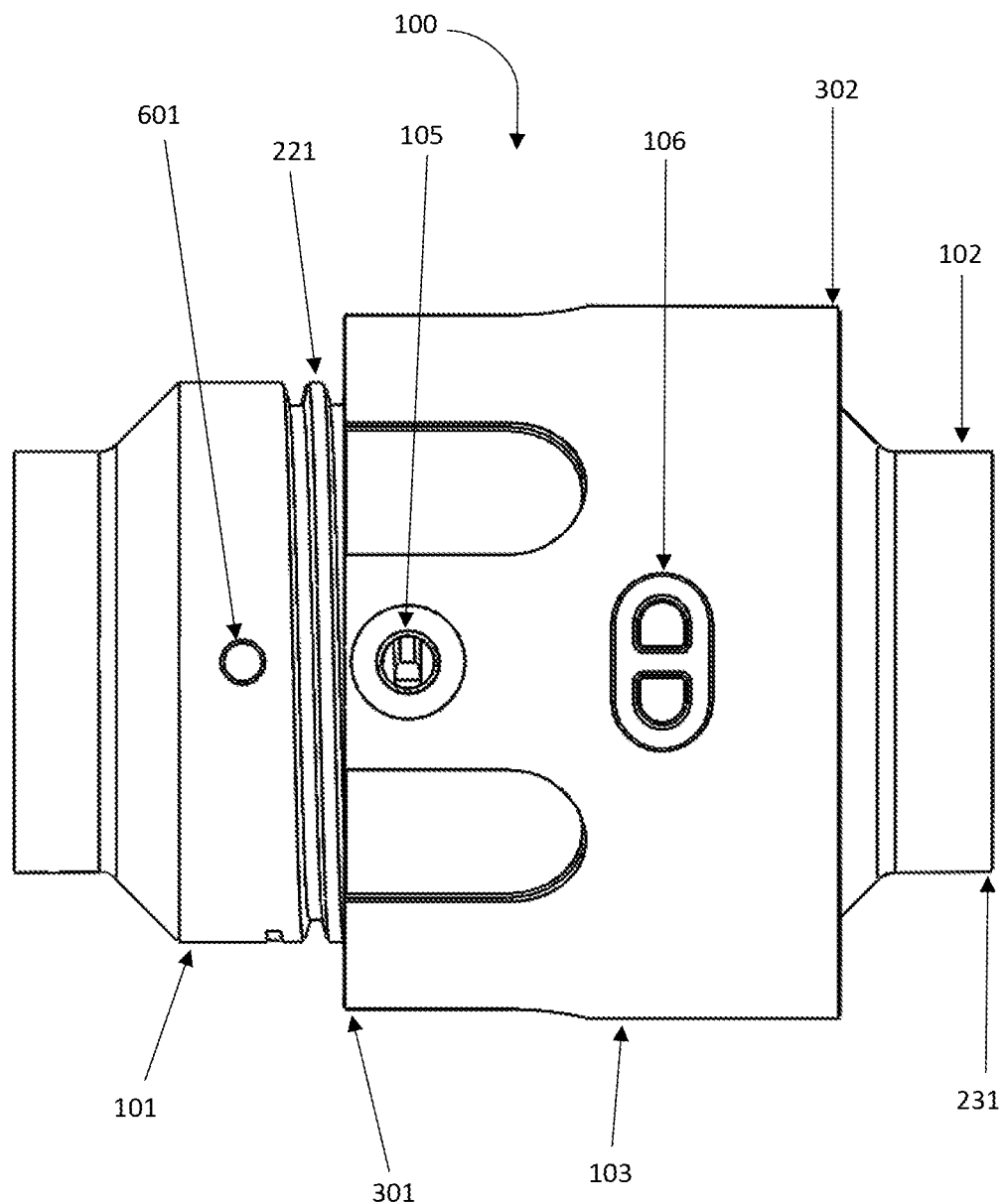
FIG. 6 depicts a top view of the invention with the female pipe at the start of threading into the collar and with the male pipe in position.

Referring now to FIG. 6, a top down view of the assembled invention is depicted. As shown, the second end 231 of the male pipe 102 extends through and past the second end 302 of the collar 103. The second end 210 of the female pipe 101 is inserted into the first end 301 of the collar 103 to the point of just engaging the screw thread 221 of the female pipe 101 with the screw thread 321 of the collar 103. This figure further depicts a pin receptor hole 601 in the female pipe 101. Pin receptor hole 601 is a blind, unthreaded hole positioned in the female pipe 101 to align with pin hole 109 in the collar 103 when the invention 100 is assembled, as described.

Figure 7:
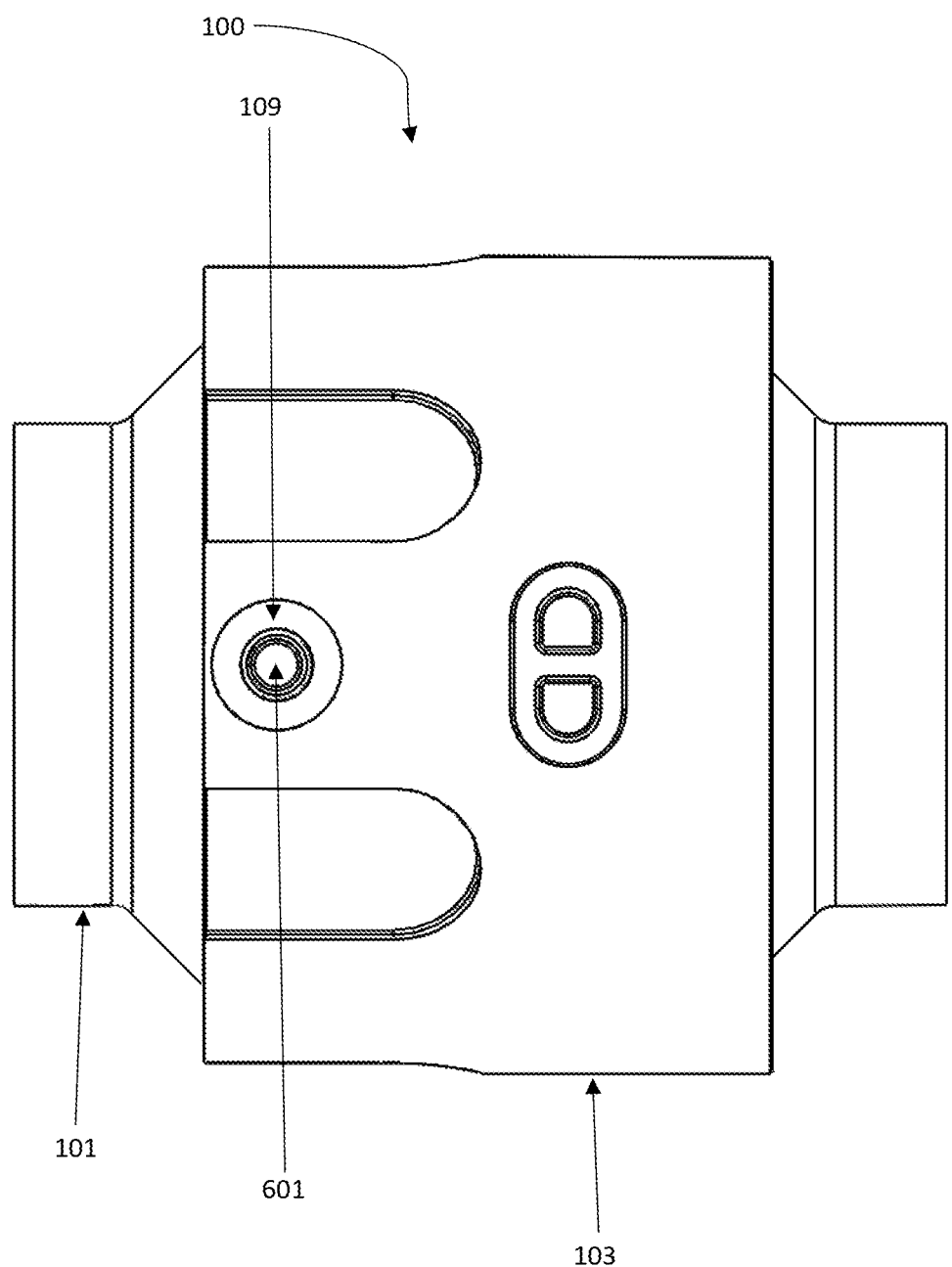
FIG. 7 depicts the assembled invention showing the orientation of the pin receptor hole of the female pipe relative to the pin hole of the collar.

Referring to FIG. 6 and FIG. 7 together, the pin receptor hole 601 is positioned on the body of the female pipe 101 and further relative to the position of each of the screw threads 221 and 321 such that when the screw thread 221 of the female pipe 101 has fully engaged the screw thread 321 of the collar 103 the pin receptor hole 601 is aligned with pin hole 109 in the collar 103 to permit the pin 105 to be inserted. At the same time, and referring also to FIG. 1, when the screw threads 221 and 321 of each of the female pipe 101 and collar 103 are fully engaged (while aligning pin hole 109 and pin receptor hole 601), the second end 211 of the female pipe 101 is engaged against, or is in close proximity to, the first end 230 of the male pipe 102. With the ring segments 104 disposed in the shaped groove 241, the second upper side 505 of each ring segment 104 is engaged against projection 111 at the second end 302 of the collar 103.

Referring to FIG. 1 and FIG. 2, on the first end 230 of the male pipe 102 there is disposed a seal groove 142. Seal groove 142 is in the form and shape of seal grooves known in the industry. Seal 201 is placed into seal groove 142 in order to provide a seal between the assembled female pipe 101 and male pipe 102. The seal 201 is not shown n position in FIG. 1. Seal 201 is made from a suitable elastomeric substance. In some embodiments, more than one seal groove 142 and more than one seal 201 may be used.

In light of the descriptions above, the inventiveness of the invention 100 is seen in the design and construction of, primarily, the length and position of the screw thread 221 of the female pipe 101 relative to the length and position of the screw thread 321 of the collar 103, and further in light of the use of the plurality of ring segments to retain the male pipe 102 in proper position relative to the female pipe 101 within the collar 103, and further in light of the need to align the pin receptor hole 601 under the pin hole 109 so that the pin 105 can be inserted, and, finally, in light of the need to compress each of the screw threads 221 and 321 functionally against each other. The coordination and positioning of one thread of a device with the thread of a second device is known in the industry as "clocking" or "timing." In the present invention 100 the clocking is equally coordinated with the positioning of other elements of the invention 100, such as the position of the pin hole 109 and the pin receptor hole 601, as well as for the need to hold the male pipe 102 in place securely to the female pipe 101 using the collar 103 and the plurality of ring segments. Applicant maintains certain details of the design requirements described in this application as proprietary trade secrets of the company. However, these design requirements can be accomplished computationally or otherwise.

Figure 8:
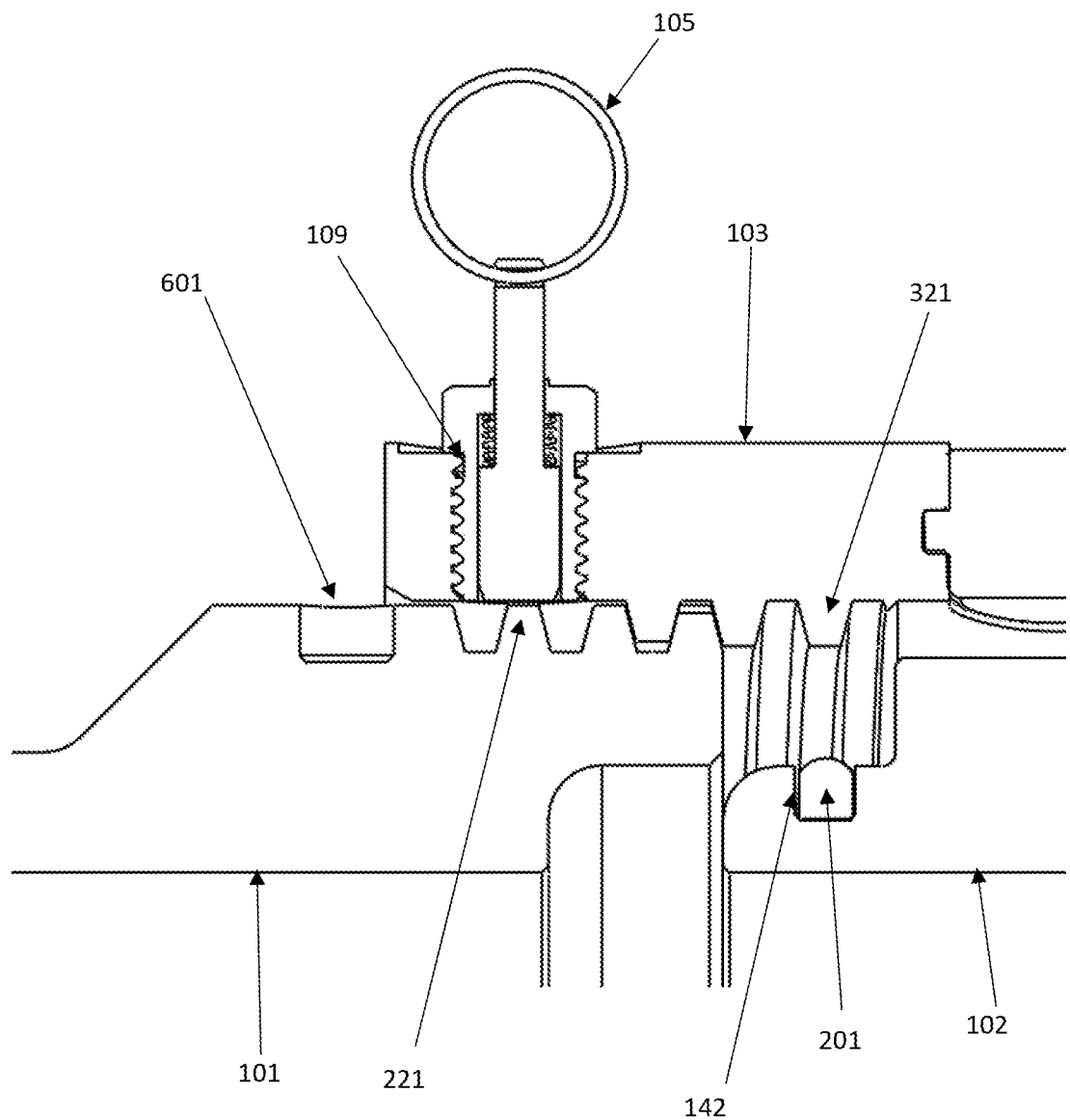
FIG. 8 depicts a partial, cutaway side view of the invention further depicting the pin hole and pin receptor hole with pin with the female pipe not yet in working position.
Figure 9:
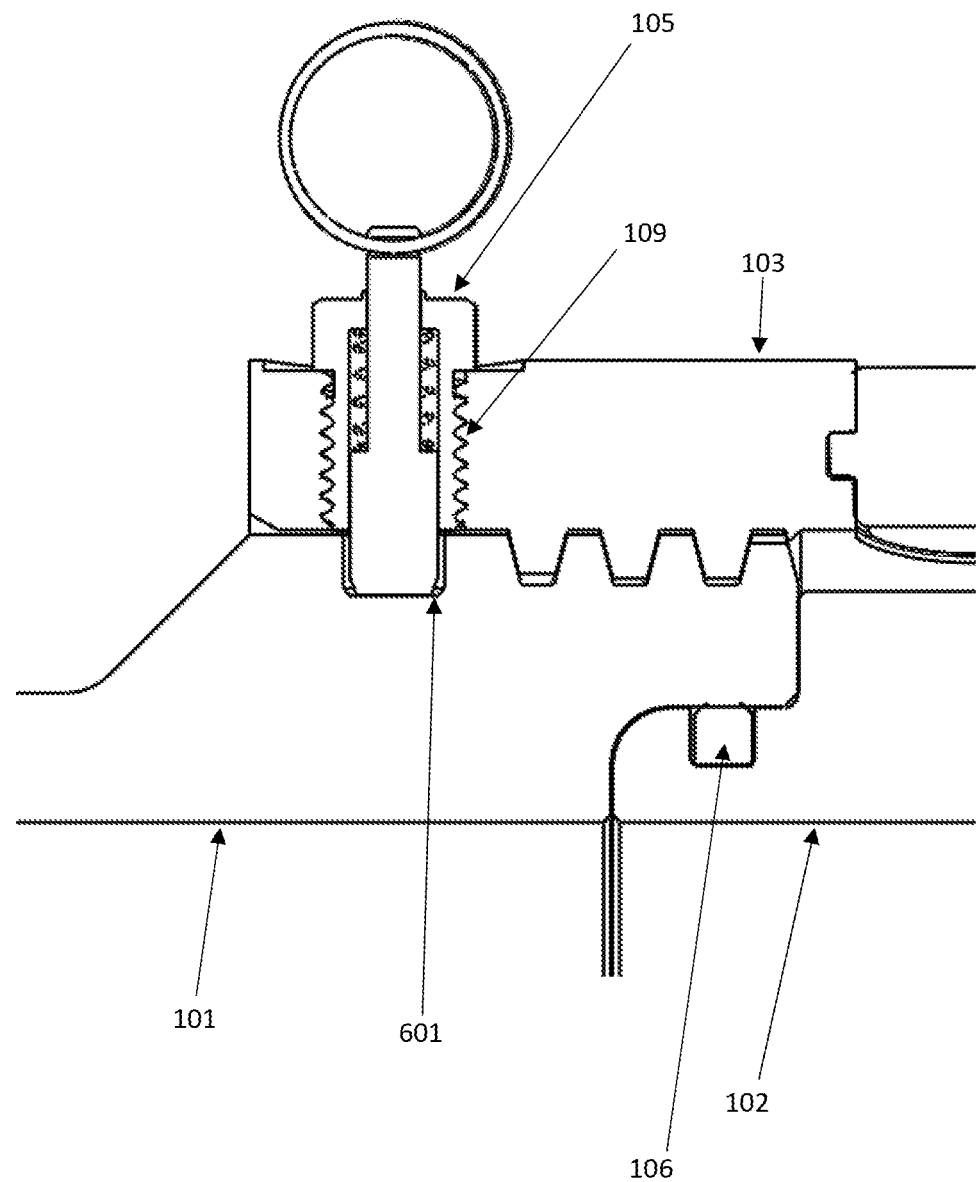
FIG. 9 depicts a partial, cutaway side view of the invention further depicting a pin relative to the pin hole and engaged with pin receptor hole.
Figure 10:
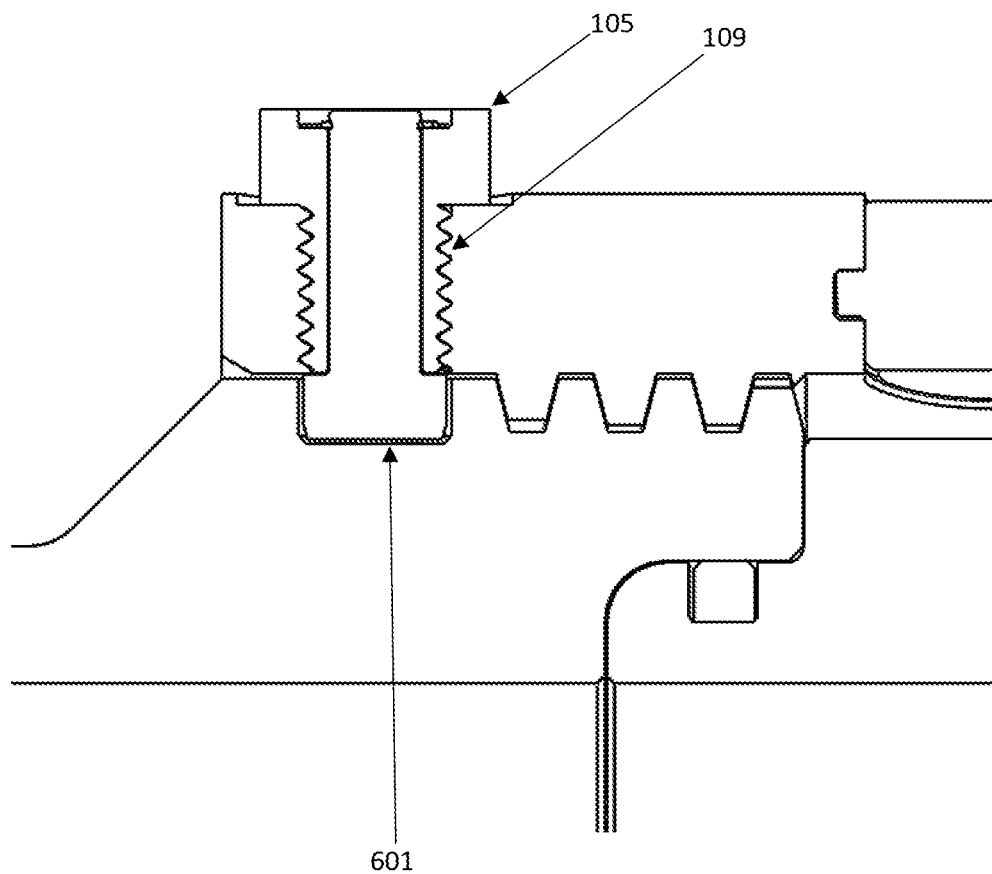
FIG. 10 depicts a partial, cutaway side view of the invention further depicting a different form of pin in place in the pin hole and pin receptor hole.

Referring now to FIG. 8, FIG. 9 and FIG. 10, the pin hole 109, pin hole receptor 601 and pin 105 are described. Referring first to FIG. 8, the second end 211 of the female pipe 101 is shown partially inserted into the first end 301 of the collar 103. The first end 230 of the male pipe 102 is shown in position in the collar 103. The screw thread 221 of the female pipe 101 is likewise shown partially screwed onto the screw thread 321 of the collar 103. FIG. 8 further depicts seal 201 in position in the seal groove 142. FIG. 8 further depicts the pin hole 109 in the collar 103 as well as pin receptor hole 601 in the second end 211 of the female pipe 101. A pin 105 is disposed in pin hole 109.

Referring to FIG. 9, there is now depicted the female pipe 101 fully screwed into collar 103. The female pipe 101 is now in sealed contact with the male pipe 102 owing to the use of the seal 201. With the screw threads 221 and 321 fully engaged, pin receptor hole 601 is directly below pin hole 109. Pin hole 109 is shown as threaded in this embodiment. One form of pin 105 is depicted. This pin 105 is screwed into the pin hole 109 and is spring loaded. Further details of the pin 105 do not add to the inventiveness of the invention 100 and are not described in detail.

Referring to FIG. 10, the same elements as depicted in FIG. 9 are shown with a different form of pin 105. Further, the pin 105 is now fully extended into pin hole 109 and pin receptor hole 601. Noting the different form of pin 105 depicted in FIG. 10 compared to FIG. 9, it is again noted any suitable form of pin 105 will suffice.

The assembly of the invention 100 is described. Referring to FIG. 1, FIG. 2, FIG. 3, FIG. 6, FIG. 7, and FIG. 10, seal 201 is placed in the seal groove 142. The second end 231 of the male pipe 102 is inserted through the first end 301 of the collar 103 until the second end 231 passes out the second end 302 of the collar 103 and the shaped groove 241 is accessible through access portal 107 in the collar 103. In some embodiments, the male pipe 102 may be longer than the collar 103. Or the male pipe 102 may be connected to other equipment. In either case, it may be clearer to understand the male pipe 102 as being held stationary, with the collar 103 slipped over the male pipe 102. Access portal 107 is sized and shaped to permit the functional insertion of the plurality of ring segments 104 into the collar 103 and onto the shaped groove 241 of the male pipe 102. The plurality of ring segments 104 are passed through the access portal 107 and assembled on the shaped groove 241 by rotating male pipe 102 axially. The collar 103 is then fully inserted over the male pipe 102 until the plurality of ring segments 104 contact the projection 111. Ring segment 104 access cover 106 is then placed in the access portal 107. It is commonly required to hold the female pipe 101 in placed manually until the male pipe 102 is assembled.

The first end 301 of the collar 103 is then slipped over the second end 211 of the female pipe 101. The female pipe 101 must be oriented such that the screw threads 221 of the female pipe 101 are able to make threadable contact with the screw threads 321 of the collar 103. Further the female pipe 101 and male pipe 102 must be oriented to allow the first end 230 of the male pipe 102 to be pressed into the recess 220 of the second end 211 of the female pipe 101 as the collar 103 is screwed onto the female pipe 101. The screw threads 321 of the collar 103 are screwed into the screw threads 221 of the female pipe 101 until (i) the first end 230 of the male pipe 102 is inserted into the recess 220 of the female pipe 101, (ii) the ring segments 104 are compressed between the shaped groove 241 of the male pipe 102 and the projection 111 of the collar 103 and (iii) pin receptor hole 601 is in position aligned with pin hole 109. The angles previously described about the ring segments 104, the shaped groove 241 and the projection 111 ensure the ring segments 104 experience primarily compressive forces and not shear forces. Pin 105 is then inserted into pin hole 109 and the pin receptor hole 601. The invention is then ready for use.

In other embodiments of the invention 100, the ring segments 104 may be replaced with a solid ring. In such an embodiment, the shaped groove 241 may be modified to remove the second groove wall 401 to enable placing the solid ring on the second end 231 of the male pipe 102 directing. In still other embodiments, the female pipe 101 and male pipe 102 are formed as a single pipe unit. A single pipe unit can accommodate a ring made of ring segments 104 or a solid ring.

I claim:

1. A union connection comprising a female pipe, a male pipe, a plurality of ring segments a collar and a pin in which the female pipe comprises thereon a clocked thread, a pin receptor hole, and a recess suitable to receive an end of a male pipe in which the clocked thread is disposed proximal to the recess of the female pipe in which the pin receptor hole is positioned relative to the clocked thread of the female pipe and is suitable to receive at least part of the pin in which the male pipe has a first end on which is disposed a pipe end configured to fit sealably into the recess of the female pipe and a second end in which disposed approximately mid-way between the first end and the second end of the male pipe is a shaped groove configured to receive a plurality of ring segments, in which further the shaped groove is positioned relative to the clocked threads of the female pipe in which the plurality of ring segments are sized and shaped to fit into the shaped groove of the male pipe in which the collar has disposed therein a clocked thread suitable to be threadedly mated to the clocked thread of the female pipe and a pin hole suitable to receive at least part of the pin in which the clocked thread of the collar is positioned relative to the clocked thread of the female pipe such that when the clocked thread of the female pipe is fully engaged with the clocked thread of the collar in the assembled invention the ring segments in the male pipe are compressed against a projection in the collar to press one end of the male pipe into the recess of the female pipe and in which the pin receptor hole of the female pipe is aligned with the pin hole of the collar to permit insertion of the pin into each.

2. The invention of claim 1 in which the shaped groove has at least one side set at an angle relative to the bottom of the shaped groove.

3. The invention of claim 2 in which the angle of the at least one side of the shaped groove is between 105 degrees and 120 degrees.

4. A device suitable to connect a gap in a pipeline comprising a first pipe connector attachable to one end of a gap in a pipeline and having disposed thereon a clocked thread, a recess to receive one end of a second pipe connector and a blind hole suitable to receive a pin;

a second pipe connector having one end attachable to a second end of a gap in a pipeline and having disposed thereon a second end suitable to be sealably secured in the recess of the first pipe connector and a groove suitable to retain a plurality of ring segments;

a plurality of ring segments shaped to fit into the groove of the second pipe connector and a connector nut suitable to fit over the exterior of the second pipe connector and having disposed therein a retainer to retain the ring segments fitted in the groove of the second pipe connector, a clocked thread mateable to the clocked thread of the first pipe connector and a hole to permit the through-insertion of a pin.

5. The invention of claim 4, in which the clocked thread of the first pipe connector and the clocked thread of the connector nut connect to compress the second pipe connector into the recess of the first pipe connector and further to align the blind hole of the first pipe connector and the hole of the connector nut to permit the insertion of the pin into each.

* * * * *